(12) United States Patent
Jackson

(10) Patent No.: US 10,814,695 B2
(45) Date of Patent: *Oct. 27, 2020

(54) ENERGY SAVING OFFSET STRATEGY FOR AUTONOMOUS VEHICLE PASSENGER CABIN

(71) Applicant: FORD GLOBAL TECHNOLOGIES, LLC, Dearborn, MI (US)

(72) Inventor: Kenneth J. Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/369,106

(22) Filed: Mar. 29, 2019

(65) Prior Publication Data

US 2019/0225049 A1 Jul. 25, 2019

Related U.S. Application Data

(63) Continuation of application No. 15/642,918, filed on Jul. 6, 2017, now Pat. No. 10,286,751.

(51) Int. Cl.
*B60H 1/00* (2006.01)
*F24F 7/007* (2006.01)
*B60K 28/04* (2006.01)

(52) U.S. Cl.
CPC ....... *B60H 1/00764* (2013.01); *B60H 1/0075* (2013.01); *B60H 1/00742* (2013.01);
(Continued)

(58) Field of Classification Search
CPC ............ B60H 1/00764; B60H 1/00642; B60H 1/00064; B60H 1/00392; B60H 1/00;
(Continued)

(56) References Cited

U.S. PATENT DOCUMENTS 6,949,021 B2 9/2005 Ichishi et al.
7,441,414 B2 * 10/2008 Ziehr ................. B60H 1/00778
165/202

(Continued)

FOREIGN PATENT DOCUMENTS

DE 102009020583 A1 * 11/2010 ............... B60H 1/00

OTHER PUBLICATIONS

Office Action dated Jul. 19, 2018 for U.S. Appl. No. 15/642,918, filed Jul. 6, 2017.

(Continued)

*Primary Examiner* — Yuri Kan
(74) *Attorney, Agent, or Firm* — David Coppiellie; Price Heneveld LLP

(57) ABSTRACT

A method for controlling a heating, ventilation, and air-conditioning (HVAC) system of an autonomous vehicle includes determining a vehicle operating status and operating the HVAC system according to the determined vehicle operating status. A control module comprising a sensor array and at least one controller operatively coupled to the sensor array and to the HVAC system controls operation of the HVAC system according to the determined vehicle operating status. The vehicle operating status is selected from one of vehicle occupied-in use, vehicle unoccupied-use requested, and vehicle unoccupied-standby. The HVAC system is operated at an operating setting providing a reduced energy consumption in a vehicle whose operating status is vehicle unoccupied-standby. The reduced energy consumption operating setting is determined according to a constant offset value or according to a variable offset value determined by inputs provided by the sensor array.

20 Claims, 3 Drawing Sheets

(52) U.S. Cl.
CPC ..... *B60H 1/00785* (2013.01); *B60H 1/00792* (2013.01); *B60K 28/04* (2013.01)

(58) Field of Classification Search
CPC .......... B60H 1/32; B60Q 9/00; B60R 25/102; B60W 50/00; F24F 7/007; B60C 23/00; G05D 23/00
See application file for complete search history.

(56) References Cited

U.S. PATENT DOCUMENTS

| | | | |
|---|---|---|---|
| 8,044,782 B2 * | 10/2011 | Saban .................... | B60N 2/002 340/438 |
| 8,827,171 B2 * | 9/2014 | Choi .................. | G05D 23/1902 236/51 |
| 9,291,256 B2 | 3/2016 | Bidner et al. | |
| 9,725,036 B1 * | 8/2017 | Tarte ........................ | B60Q 9/00 |
| 10,286,751 B2 * | 5/2019 | Jackson ............. | B60H 1/00764 |
| 2003/0193404 A1 * | 10/2003 | Joao ..................... | B60R 25/102 340/12.22 |
| 2003/0206102 A1 * | 11/2003 | Joao ...................... | B60R 25/102 340/539.1 |
| 2008/0047277 A1 | 2/2008 | Kim | |
| 2009/0007878 A1 | 1/2009 | Korenjak et al. | |
| 2009/0078781 A1 * | 3/2009 | Kanemaru ......... | B60H 1/00742 236/49.3 |
| 2009/0130966 A1 | 5/2009 | Tucker | |
| 2010/0019050 A1 * | 1/2010 | Han ................... | B60H 1/00642 236/44 C |
| 2015/0041113 A1 * | 2/2015 | Enke .................. | B60H 1/00392 165/202 |
| 2015/0258998 A1 * | 9/2015 | Kusumi .................. | B60L 1/003 701/22 |
| 2015/0266357 A1 | 9/2015 | Bidner et al. | |
| 2018/0001734 A1 * | 1/2018 | Faust ................. | B60H 1/00064 |

OTHER PUBLICATIONS

English Machine Translation of DE102009020583A1 dated Nov. 11, 2010.
Notice of Allowance dated Jan. 10, 2019 for U.S. Appl. No. 15/642,918, filed Jul. 6, 2017.

* cited by examiner

ENERGY SAVING OFFSET STRATEGY FOR AUTONOMOUS VEHICLE PASSENGER CABIN

This application is a continuation application claiming priority to U.S. patent application Ser. No. 15/642,918 filed on Jul. 6, 2017, now U.S. Pat. No. 10,286,751, the full disclosure of which is incorporated herein by reference.

TECHNICAL FIELD

The present disclosure generally relates to autonomous vehicles. More specifically, the present disclosure relates to passenger cabin climate control strategies for energy savings in autonomous vehicles.

BACKGROUND

Autonomous vehicles, also variously referred to as driverless vehicles, self-driving vehicles, and robotic cars, are as is known vehicles capable via a navigation system of sensing their environment and navigating between destinations without requiring human input or control. The navigation system typically comprises a combination of on-board and remotely located systems and/or services, and may variously based on radar, laser light, global positioning satellite (GPS), odometry, and computer vision technologies. Autonomous vehicles further include control systems capable of analysing sensory data to distinguish between different vehicles encountered on the path of travel, to allow plotting a course between locations. While fully autonomous vehicles (i.e., vehicles lacking any means of driver input) are currently not permitted on public roadways, this technology when fully developed and implemented will provide numerous advantages, including without intending any limitation reductions in traffic gridlock and improvements in traffic flow, including reductions in traffic collisions and associated injuries and economic cost, increased travel options for physically impaired individuals, reduced requirements for parking capacity, reductions in crime, and others.

A further potential advantage for autonomous vehicle technology is facilitation of new business models for mobility as a service, particularly in a sharing economy. Indeed, it is anticipated that the initial applications of first-generation autonomous vehicle technology will be for use in for-profit vehicle fleets. A user desiring to travel from her current location to a destination would simply issue (and pay for) a request for a ride from a for-profit enterprise, and in due course an autonomous vehicle would arrive to the user's location to collect her.

Among other concerns attendant to a for-profit fleet of autonomous vehicles is energy consumption, since for any vehicle fleet, autonomous or otherwise, increased vehicle energy consumption directly translates to increased overhead and reduced profits. A likely strategy for fleet owners would be to provide autonomous vehicles that are as fuel-efficient as current technology makes feasible. However, the manner of operation of even highly fuel-efficient vehicles can influence energy consumption positively or negatively and is also a factor to be considered by fleet owners/operators.

For example, for an unoccupied autonomous vehicle it would certainly be possible to simply change the vehicle heating, ventilation, and air-conditioning (HVAC) system from an "on" to an "off" setting to reduce energy consumption while the vehicle is not actively in use or in service. However, prior to returning the autonomous vehicle to service, i.e. picking up a passenger, the HVAC system would have to be activated to return the vehicle passenger cabin to a comfortable temperature and/or humidity set point. Absent this step, the passenger cabin could be too hot or too cold for the passenger's liking, and passenger dissatisfaction would result. Operating the HVAC system at a constant setting to keep the passenger cabin at the desired temperature, etc. set point even when the vehicle is not actively in use (i.e. on "standby") would increase energy consumption. Likewise, turning the HVAC system off during vehicle standby and on to restore the vehicle passenger cabin conditions to desired levels of temperature, etc. prior to returning the vehicle to service would require increased levels of energy consumption, particularly at very hot or very cold ambient temperatures, and would increase the time required to bring the passenger cabin back to a desired comfort level, thereby reducing paid use time for the vehicle.

Accordingly, there is identified a need in the art for methods of reducing energy consumption of autonomous vehicles. The present disclosure solves this and other problems by providing methods and attendant systems for controlling an autonomous vehicle climate control system according to a determined vehicle operating status, and thereby reducing energy consumption of autonomous vehicles.

SUMMARY

In accordance with the purposes and benefits described herein, in one aspect of the present disclosure a method for controlling a climate control system of an autonomous vehicle is provided, comprising determining a vehicle operating status and operating the climate control system according to the determined vehicle operating status. The step of operating the climate control system according to the determined vehicle operating status is performed by a control module comprising a sensor array and at least one controller operatively coupled to the sensor array and to the climate control system. The at least one controller selects the vehicle operating status from the group consisting of vehicle occupied-in use, vehicle unoccupied-use requested, and vehicle unoccupied-standby.

The at least one controller operates the climate control system at a first operating setting on determining that the vehicle operating status is one of vehicle occupied use or vehicle use requested and operates the climate control system at a second operating setting providing a lesser energy consumption than the first operating setting on determining that the vehicle operating status is vehicle standby. The second operating setting may be determined by the controller by adjusting the first operating setting according to a predetermined offset value.

In embodiments, the first operating setting is adjusted by the at least one controller according to a constant offset value to provide the second operating setting. In alternative embodiments, the first operating setting is adjusted by the at least one controller according to a variable offset value to provide the second operating setting.

In embodiments, a sensor array is provided comprising a vehicle-exterior ambient temperature sensor and the at least one controller determines the variable offset value according to a determined vehicle-exterior ambient temperature input provided by the vehicle-exterior ambient temperature sensor. In alternative or additional embodiments, the sensor array also includes a passenger cabin solar load sensor and a passenger cabin humidity sensor, and the at least one controller determines the variable offset value according to a passenger cabin solar load input provided by the passenger cabin solar load sensor and/or a passenger cabin humidity input provided by the passenger cabin humidity sensor.

In another aspect of the present disclosure, a system for controlling energy consumption in an autonomous vehicle is provided, comprising a climate control system and a control module operatively coupled to the climate control system. The control module comprises a sensor array and at least one controller configured to determine a vehicle operating status and to operate the climate control system according to the determined vehicle operating status and one or more inputs from the sensor array. The at least one controller is configured to determine the vehicle operating status from the group consisting of vehicle occupied-in use, vehicle unoccupied-use requested, and vehicle unoccupied-standby.

The at least one controller is configured to operate the climate control system at a first operating setting on determining by the controller module that the vehicle operating status is one of vehicle occupied or vehicle use requested. In turn, the at least one controller is configured to operate the system at a second operating setting providing a lesser energy consumption than the first operating setting on determining by the controller module that the vehicle operating status is vehicle standby. The at least one controller is further configured to determine the second operating setting by adjusting the first operating setting according to a predetermined offset value.

In embodiments, the at least one controller is configured to adjust the first operating setting according to a constant offset value. In alternative embodiments, the at least one controller is configured to adjust the first operating setting according to a variable offset value. In embodiments, the sensor array comprises a vehicle-exterior ambient temperatures sensor and the at least one controller is configured to alter the variable offset value according to a determined vehicle-exterior ambient temperature input provided by the vehicle-exterior ambient temperature sensor. In alternative or additional embodiments, the sensor array further comprises a passenger cabin solar load sensor and a passenger cabin humidity sensor, and the at least one controller is further configured to alter the variable offset value according to a determined passenger cabin solar load input provided by the solar load sensor and/or a passenger cabin humidity input provided by the passenger cabin humidity sensor.

In the following description, there are shown and described embodiments of the disclosed methods and systems for controlling a climate control system of an autonomous vehicle. As it should be realized, the described methods and associated systems are capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed methods and systems for controlling a climate control system of an autonomous vehicle, and together with the description serve to explain certain principles thereof. In the drawings.

Reference will now be made in detail to embodiments of the disclosed methods and systems for controlling a climate control system of an autonomous vehicle, examples of which are illustrated in the accompanying drawing figures.

DETAILED DESCRIPTION

Preliminarily, various methods and systems for controlling navigation and other functions of autonomous vehicles are known. A full description of such methods and systems exceeds the scope of the present disclosure and is not undertaken herein. Further, the presently described methods and attendant systems for controlling a climate control system of an autonomous vehicle are primarily described in the context of controlling a heating, ventilation, and air-conditioning (HVAC) system of the vehicle. However, as is known, other vehicle systems may form part of a vehicle climate control system, for example power-operated windows adapted to automatically open or close under certain predetermined passenger cabin conditions of temperature, humidity, airborne pollutant particulates, etc. Still more, it will be appreciated by the skilled artisan that the presently described methods and attendant systems for controlling a climate control system of an autonomous vehicle are equally applicable to fully autonomous vehicles, partially autonomous vehicles, and conventional or non-autonomous vehicles. Accordingly, the present disclosure will not be taken as limiting in this regard.

Figure 1:
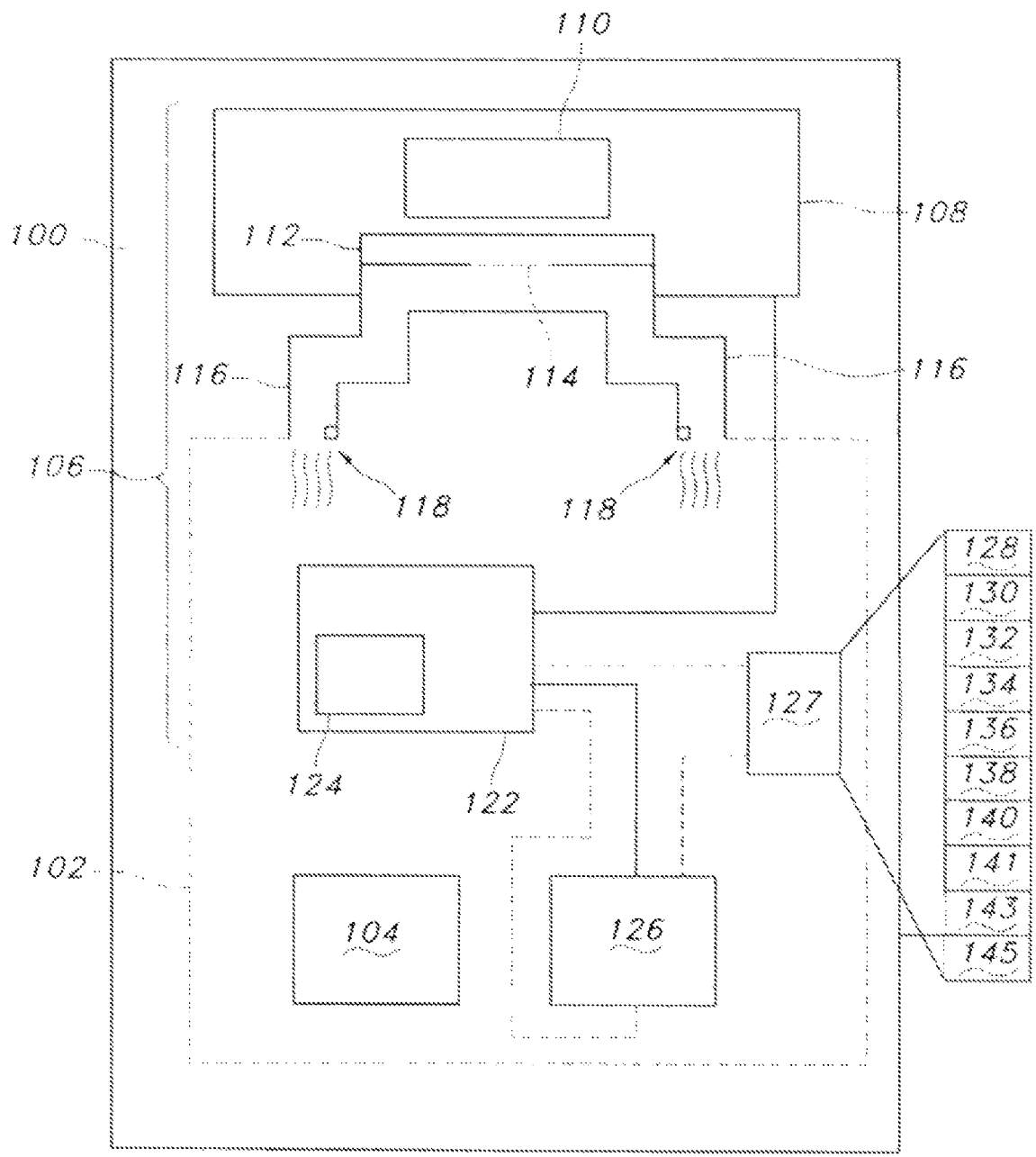
FIG. 1 shows in schematic form an autonomous vehicle including a climate control system and a control module adapted to control the climate control module according to the present disclosure.

FIG. 1 illustrates a system by which the presently described methods for controlling a climate control system of an autonomous vehicle 100 including a passenger cabin 102 may be implemented. The vehicle 100 further includes as described above a navigational control system, the specific mechanical and operational details of which exceed the scope of the present disclosure, which is represented generally by reference numeral 104 but which may include at least a system for determining a geographical position of the vehicle 100 such as a Global Positioning Satellite system.

The vehicle 100 further includes a climate control system 106, including at least an HVAC system 108, which in turn comprises at least an HVAC evaporator core 110. The HVAC system 108 further includes an HVAC blower 112 in fluid communication with an HVAC air distribution door 114. The HVAC air distribution door 114 in turn places the HVAC blower 112 in fluid communication with an HVAC duct system 116 via which conditioned airflow is introduced into the passenger cabin 102 by way of air registers 118.

A climate control system 106 is in operative communication with the HVAC system 108. By the climate control system 106, the HVAC system 108 may automatically or by user command control an amount and a temperature of airflow introduced into the passenger cabin 102. Operative control is provided by a climate control module (CCM) 122 comprising at least one controller 124 provided with one or more processors, one or more memories, and storage comprising logic configured for controlling the vehicle HVAC system 108. The climate control system 106 may further be in operative communication with other onboard vehicle controllers, for example a Body Control Module (BCM) 126, other electronic control units (ECU; not shown), and others.

The climate control module 122 and/or the at least one controller 124 are further in communication with and receive inputs from a sensor array 127 comprising a variety of onboard sensors, including without intending any limitation one or more of an HVAC evaporator core temperature sensor 128, one or more HVAC duct discharge air temperature sensors 130, one or more vehicle-exterior ambient temperature sensors 132, one or more passenger cabin solar load sensors 134, one or more occupancy sensors 136, one or more wheel sensors 138, one or more engine rpm sensors 140, one or more vehicle-interior temperature sensors 141, one or more vehicle-interior humidity sensors 143, and others. Implementation of still other sensors is contemplated, for example door sensors 145 which determine an open or closed status of the vehicle 100 doors. The specific mechanisms and operative details of such sensors are known in the art and, a full description thereof exceed the scope of the present disclosure. It will be appreciated that the depiction of the various sensors described above in FIG. 1 is for convenience only and does not necessarily reflect actual positioning of such sensors in a vehicle 100.

The present disclosure also provides methods for controlling the climate control system 106 to positively impact various relevant factors including without intending any limitation reducing time from vehicle engagement by a passenger to vehicle availability (as a function of passenger cabin 102 temperature), reducing time required to heat/cool the passenger cabin 102 to a predetermined comfort level C, reducing energy consumption of the autonomous vehicle 100, and others. At a high level, the methods comprise determining a vehicle 100 operating status, and operating the climate control system 106 in accordance with that status.

For purposes of the methods as described herein, three operating status conditions are considered relevant. The first is "vehicle 100 occupied," i.e., the vehicle 100 has at least one passenger in the passenger cabin 102 and is potentially actively transporting the at least one passenger to a destination. In this situation, it is desirable to have the passenger cabin 102 at a predetermined level of comfort (temperature, humidity, etc.) satisfactory to a passenger. A next relevant operating status is "vehicle 100 use requested." In this situation, the autonomous vehicle 100 is currently unoccupied, but has been called and/or dispatched to pick up one or more passengers. Here, it is also desirable to have the passenger cabin 102 at a predetermined level of comfort (temperature, humidity, etc.) satisfactory to a passenger. A third relevant operating status is "vehicle 100 standby." In this situation, the autonomous vehicle 100 is unoccupied, and has not yet been engaged to travel to a location to pick up a passenger. Here, setting the passenger cabin 102 to the predetermined level of comfort, while possible, would result in unnecessary energy consumption. However, turning the climate control system 106 to an "off" setting would likewise require unnecessary energy consumption to bring the passenger cabin 102 to the predetermined level of comfort at such time as the vehicle 100 was engaged to travel to a passenger for pickup and/or picked up the passenger, particularly in hot or cold ambient conditions.

Figure 2:
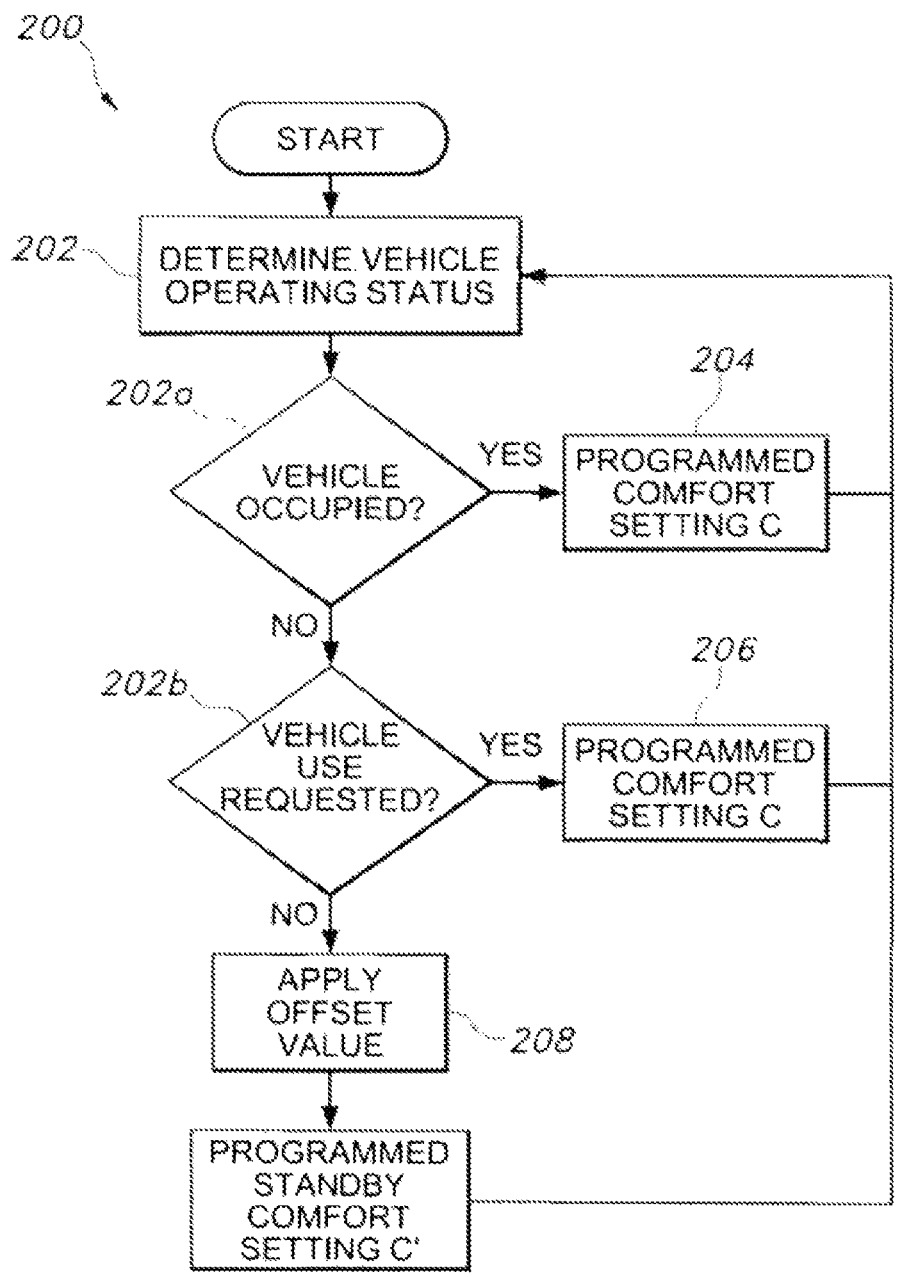
FIG. 2 shows an embodiment of a method according to the present disclosure for controlling a climate control system of an autonomous vehicle.

To solve this problem, a method 200 for controlling a climate control system 106 to reduce energy consumption by an autonomous vehicle 100 is provided, an embodiment of which is illustrated in flow chart form in FIG. 2. For purposes of the described method, it is presumed that the autonomous vehicle 100 is "on," i.e. is at a Ready to Drive State and available for use to transport passengers.

At step 202, the climate control module 122 queries a vehicle 100 operating status as described above as one of "vehicle 100 occupied" (step 202a), "vehicle 100 use requested" (step 202b), or "vehicle 100 standby" (step 202c). Alternatively, a different control module such as the BCM 126 may provide this query and communicate commands to the climate control module 122 accordingly. There are a number of ways this step could be effected. For example, the determination of "vehicle occupied" may be effected by the climate control module 122 and/or BCM 126 receiving inputs from occupancy sensors 136. The inputs may be provided by a number of sensor types, for example vehicle seat-mounted pressure sensors including but not limited to as those used in association with air bags, vehicle dash panel- or headliner-mounted cameras, vehicle dash panel- or headliner-mounted proximity sensors, infrared or other motion sensors, and other sensors adapted to detect the presence of a passenger in the passenger cabin 102 and to send an input indicative of that presence. The determination of "vehicle 100 use requested" can likewise be determined by the climate control module 122 or other module (BCM 126, etc.) by receiving inputs from one or more wheel sensors 138 and/or engine sensors 140 (indicative that the autonomous vehicle 100 is traveling) or others.

Figure 3:
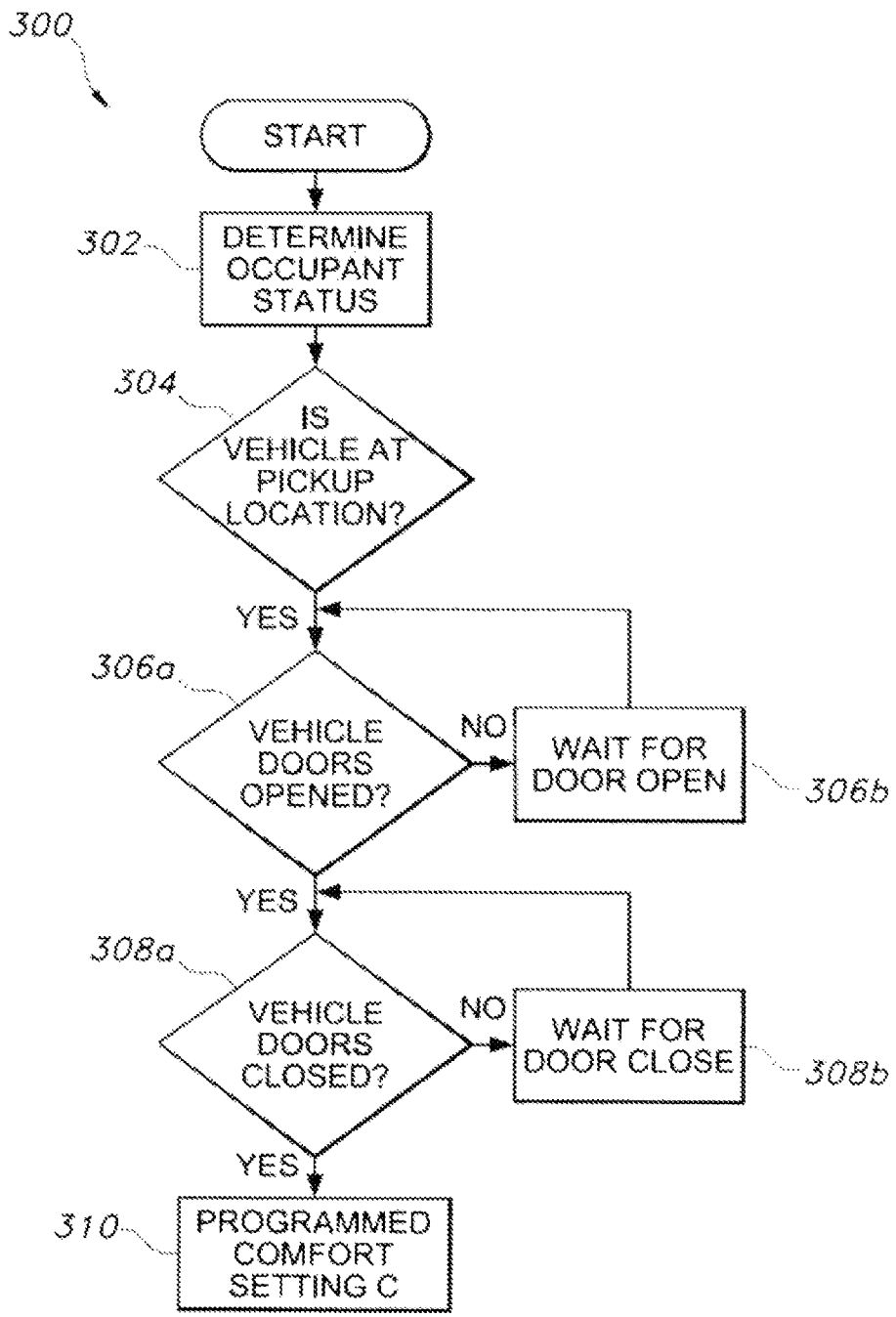
FIG. 3 shows an embodiment of a method according to the present disclosure for determining an occupant status of an autonomous vehicle.

In other embodiments, a vehicle occupant status may be determined by preprogrammed logic. An embodiment of this is illustrated in FIG. 3, showing a method 300 for determining a vehicle occupant status (i.e., vehicle 100 occupied) according to various inputs received by the climate control module 122 and/or the at least one controller 124 and/or BCM 126 and/or other dedicated controllers. At step 302, a vehicle 100 occupant status (i.e., occupied, or not) is determined to resolve whether the vehicle has taken on one or more passengers. At step 304, a determination of whether the vehicle 100 has reached a desired pickup location. This may be done by any suitable means, for example the vehicle navigational control system 104 communicating with one or more of climate control module 122 and/or the at least one controller 124 and/or BCM 126 and/or other dedicated controllers to match a present location of the vehicle 100 with a determined geographical pickup location at which one or more passengers are to be picked up. At step 306a, a determination of whether the vehicle 100 doors have been opened, which would be indicative of the one or more passengers entering the vehicle. If not, the system waits for an indication of a "door opened" status. As will be appreciated, this could be provided by a number of mechanisms, including without intending any limitation suitable electronic or mechanical (pressure) door sensors 145 associated with the vehicle doors.

At step 308a, a determination is made of whether the vehicle 100 doors have been closed, indicative that the one or more passengers have entered the vehicle and are ready to proceed to their chosen destination. If not, the system waits for an indication of a "door closed" status. If so, at step 310 the system implements the predetermined/preset level of comfort C (temperature, humidity, etc.) that has been determined to be at least adequately satisfactory to passengers.

Returning to FIG. 2, if the climate control module 122 and/or BCM 126 determine that the vehicle 100 operating status is one of "vehicle 100 occupied" or "vehicle 100 use requested," respectively at steps 204/206 the climate control module 122 operates one or more elements of the climate control system 106 such as HVAC system 108 to bring the passenger cabin 102 to or maintain the passenger cabin 102 at a first operating setting providing predetermined/preset level of comfort C (temperature, humidity, etc.) that has been determined to be at least adequately satisfactory to passengers. As will be appreciated, this may be a predetermined passenger cabin 102 temperature that has been determined to be at least adequately satisfactory to passengers, provided by operating the HVAC system 108 to heat or cool the passenger cabin 102 interior as needed according to a vehicle-exterior ambient temperature.

On the other hand, if the climate control module 122/BCM 126 query determines that the vehicle 100 operating status is "vehicle 100 standby" (step 202c), at step 208 the climate control module 122/BCM 126 adjust the predetermined/preset level of comfort C by an offset value to heat or cool (as needed) the passenger cabin 102 interior to a predetermined standby level of comfort C' (step 210). These offset values will be discussed in greater detail below. As will be appreciated, this predetermined standby level of comfort C' is provided by operating the climate control system 106/HVAC system 108 to sufficiently heat or cool (as needed) the passenger cabin 102 interior whereby, when the operating status of the vehicle 100 is subsequently determined to be one of "vehicle 100 occupied" or "vehicle 100 use requested" the energy consumption required to bring the passenger cabin to the predetermined/preset level of comfort C will be less than would have been the case if the climate control system 106/HVAC system 108 had simply been turned off.

The predetermined/preset level of comfort C may be adjusted by a constant offset value to heat or cool (as needed) the passenger cabin 102 interior to a predetermined standby level of comfort C'. When ambient temperatures are "warm," the system allows the passenger cabin 102 to get warmer by the determined offset value, as indicated by a positive value for offset. When ambient temperatures are "cool," the system allows the passenger cabin 102 to get cooler by the determined offset, as indicated by a negative offset value. One possible embodiment relying solely on determined vehicle-exterior ambient temperature is illustrated in Table 1.

TABLE 1

| Constant offset value. | |
|---|---|
| Ambient > 15 C. | +4° C. |
| Ambient < 15 C. | −4° C. |

In another possible embodiment, the predetermined/preset level of comfort C may be adjusted by a constant offset that factors in a determined solar load, provided to the climate control module 122/BCM 126 by one or more passenger cabin solar load sensors 134. One possible embodiment is illustrated in Table 2 below.

TABLE 2

| Constant offset value with solar load. | | |
|---|---|---|
| Temperature | Solar Load | Offset |
| Ambient > 20° C. | Solar load High | +4° C. |
| | Solar load Low | +6° C. |
| Ambient < 20° C. | Solar load High | +8° C. |
| | Solar load Low | −4° C. |

Here, the designator "−" indicates an offset to provide a setting colder than a predetermined comfort setting (in one possible example 23° C.). The designator "+" indicates an offset to provide a setting warmer than the predetermined comfort setting.

In yet another possible embodiment, the predetermined/preset level of comfort C may be adjusted by a variable or sliding offset value to heat or cool (as needed) the passenger cabin 102 interior to a predetermined standby level of comfort C'. One possible embodiment wherein the offset value is determined on a sliding scale according to a range of vehicle-exterior ambient temperatures is illustrated in Table 3.

TABLE 3

| Variable offset value. | | | | | | | |
|---|---|---|---|---|---|---|---|
| Ambient temperature (° C.) | | | | | | | |
| | −18 | −10 | 0 | 10 | 20 | 30 | 40 |
| Offset | −4° C. | −5° C. | −5° C. | 0° C. | +6° C. | +5° C. | +4° C. |

Here, the application of variable offsets is determined by a vehicle-exterior ambient temperature, which in turn is determined by the climate control module 122 and/or BCM 126 according to inputs provided by one or more vehicle-exterior ambient temperature sensors 132.

As will be appreciated, the particular set of variable or sliding offset values could also be further calibrated according to other factors affecting passenger cabin 102 interior temperature, such as without intending any limitation by inputs provided by one or more passenger cabin solar load sensors 134, one or more vehicle-interior humidity sensors 143, and others. An embodiment of this is illustrated below in Table 4.

TABLE 4

| Variable offset value with solar load. | | | | | | | |
|---|---|---|---|---|---|---|---|
| Ambient temperature (° C.) | | | | | | | |
| | −18 | −10 | 0 | 10 | 20 | 30 | 40 |
| Solar load High, Humidity High | −4° C. | −5° C. | −5° C. | −5° C. | +5° C. | +4° C. | +3° C. |
| Solar load Low, Humidity High Solar load High, Humidity Low Solar load Low, Humidity High | −3° C. | −4° C. | −4° C. | −3° C. | +6° C. | +5° C. | +4° C. |

In the above embodiment, >25° C. would be considered "warm" ambient temperatures. For situations of high humidity and high solar load in passenger cabin 102, cooling load and "time to comfort" would be increased, minimizing offset opportunity in warm ambient conditions. A condition of "low solar load and high humidity" would require more moderate passenger cabin 102 cooling states, allowing increased offset in warm ambient conditions. In turn, low solar load and low humidity conditions. A condition of low solar load and low humidity would require the lowest cooling load for passenger cabin 102, allowing the most offset from a predetermined comfort setting C in warm ambient conditions.

At ambient temperatures below 0° C., ambient humidity would not be a factor because the vehicle air-conditioning system would not be used to dry passenger cabin 102 air. At cool ambient temperatures, a high solar load allows an increased offset because the solar load will slow passenger cabin 102 cooling and increase passenger cabin warm-up. On the other hand, at cool ambient temperatures, a low solar load will allow a reduced offset because the passenger cabin 102 will cool at a faster rate and warm up at a slower rate.

It will be appreciated that the above offset values are representative only and illustrate likely trends according to the environmental factors considered. The specific offset values will vary in accordance with vehicle size and type, the presence or absence of features affecting passenger cabin 102 solar load and/or temperature such as window shades, tinted windows, privacy glass, etc. In an embodiment, the offset value could be determined, for example by the climate control module 122 and/or BCM 126, according to the formula:

Temperature offset=$f(T_{programmed\ comfort\ setting\ C}, T_{ambient}$, Humidity, Solar Load, Time to next fare, Location).

In one particular embodiment, the above-described method 200 finds use in controlling energy consumption of an autonomous vehicle 100 particularly in ambient temperatures representing excessively hot or cold conditions, when as will be appreciated the interior of the passenger cabin 102 of an autonomous vehicle on a standby operating status will rapidly heat or cool, potentially to extreme temperatures. However, the skilled artisan will readily appreciate that the described method 200 equally finds utility in less extreme ambient conditions, and so the application of the methods and systems during extremes of heat or cold should not be taken as limiting.

Obvious modifications and variations are possible in light of the above teachings. All such modifications and variations are within the scope of the appended claims when interpreted in accordance with the breadth to which they are fairly, legally and equitably entitled.

What is claimed:

1. In an autonomous vehicle, a method for controlling a climate control system, comprising:
   operating the climate control system at a first operating setting on determining that an autonomous vehicle operating status is one of vehicle occupied-in use or vehicle unoccupied-use requested; and
   adjusting the first operating setting to a second operating setting on determining that the vehicle operating status is vehicle unoccupied-standby.

2. The method of claim 1, wherein the second operating setting requires a lesser vehicle energy consumption than the first operating setting.

3. The method of claim 1, wherein the steps of operating and adjusting are performed by a controller operatively coupled to the climate control system, the controller coupled to a sensor array.

4. The method of claim 3, including, by the controller, determining the second operating setting by adjusting the first operating setting according to an offset value.

5. The method of claim 4, including, by the controller, adjusting the first operating setting according to a constant offset value.

6. The method of claim 4, including, by the controller, adjusting the first operating setting according to a variable offset value.

7. The method of claim 6, including providing the sensor array comprising one or more of a vehicle-exterior ambient temperature sensor, a passenger cabin solar load sensor and a passenger cabin humidity sensor.

8. The method of claim 7, including by the controller determining the variable offset value according to a determined vehicle-exterior ambient temperature input provided by the vehicle-exterior ambient temperature sensor.

9. The method of claim 8, further including by the controller altering the determined variable offset value according to one or both of a passenger cabin solar load input provided by the passenger cabin solar load sensor and a passenger cabin humidity input provided by the passenger cabin humidity sensor.

10. A system for controlling a climate control system of an autonomous vehicle, comprising:
    a controller operatively coupled to the climate control system and coupled to a sensor array;
    wherein the controller is configured to operate the climate control system at a first operating setting on determining that an autonomous vehicle operating status is one of vehicle occupied-in use or vehicle unoccupied-use requested; and
    further wherein the controller is configured to adjust the first operating setting to a second operating setting on determining that the vehicle operating status is vehicle unoccupied-standby.

11. The system of claim 10, wherein the second operating setting requires a lesser vehicle energy consumption than the first operating setting.

12. The system of claim 10, wherein the controller is configured to adjust the first operating setting according to an offset value.

13. The system of claim 12, wherein the controller is configured to adjust the first operating setting according to a constant offset value.

14. The system of claim 12, wherein the controller is configured to adjust the first operating setting according to a variable offset value.

15. The system of claim 14, wherein the sensor array comprises one or more of a vehicle-exterior ambient temperature sensor, a passenger cabin solar load sensor and a passenger cabin humidity sensor.

16. The system of claim 15, wherein the controller is further configured to determine the variable offset value according to a determined vehicle-exterior ambient temperature input provided by the vehicle-exterior ambient temperature sensor.

17. The system of claim 16, wherein the controller is further configured to alter the determined variable offset value according to one or both of a determined passenger cabin solar load input provided by the solar load sensor and a passenger cabin humidity input provided by the passenger cabin humidity sensor.

18. A method for controlling a climate control system of an autonomous vehicle, comprising:
    providing a controller operatively coupled to the climate control system, the controller coupled to a sensor array;

by the controller, operating the climate control system at a first operating setting on determining that an autonomous vehicle operating status is one of vehicle occupied-in use or vehicle unoccupied-use requested; and by the controller, adjusting the first operating setting according to an offset value to provide a second operating setting requiring a lesser vehicle energy consumption than the first operating setting on determining that the vehicle operating status is vehicle unoccupied-standby.

19. The method of claim 18 wherein the offset value is a constant offset value.

20. The method of claim 18 wherein the offset value is a variable offset value determined by the controller according to one or more of a determined vehicle-exterior ambient temperature input provided by a vehicle-exterior ambient temperature sensor, a passenger cabin solar load input provided by a passenger cabin solar load sensor, and a passenger cabin humidity input provided by a passenger cabin humidity sensor.

* * * * *